Patented July 15, 1941

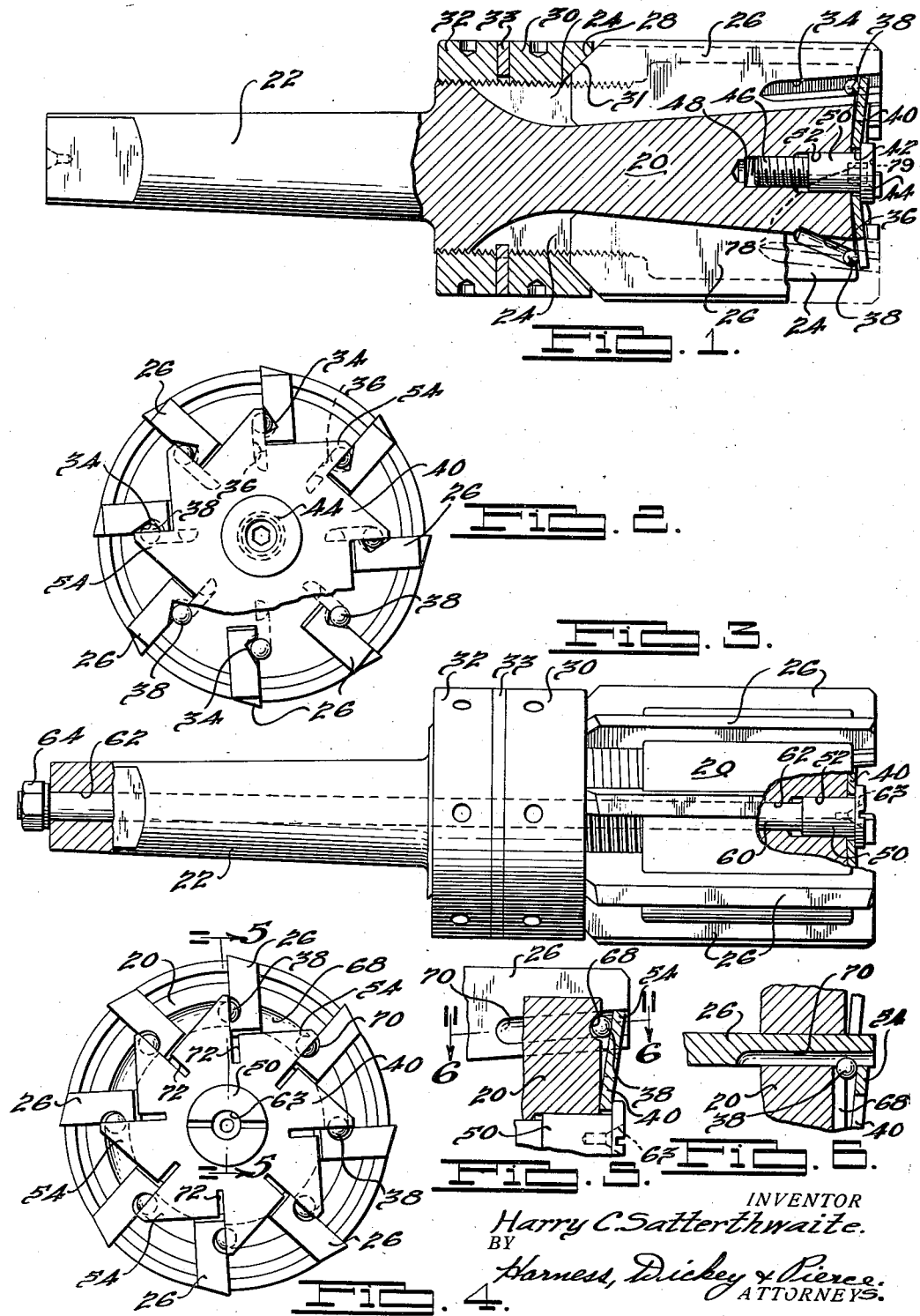

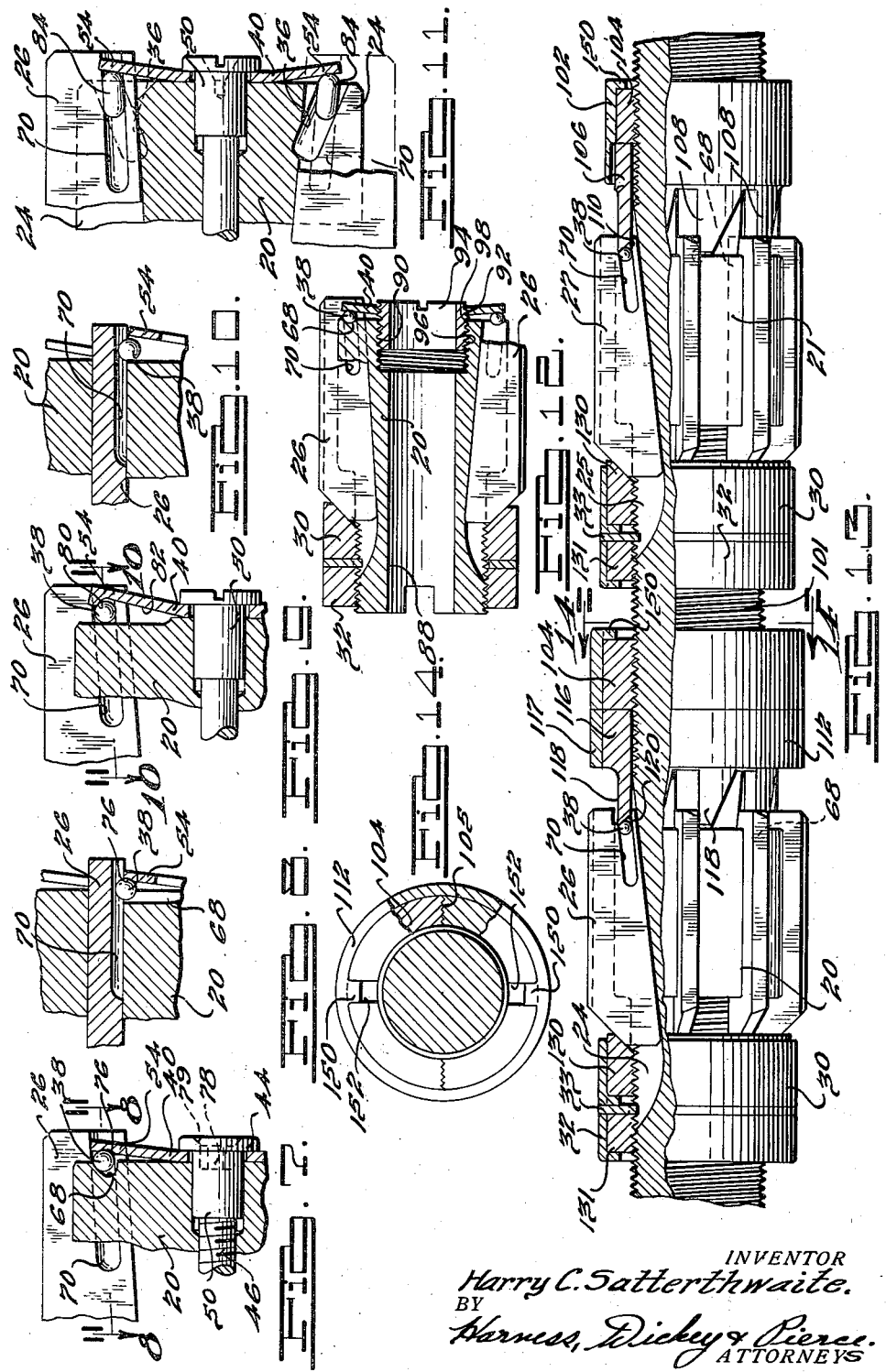

2,249,437

UNITED STATES PATENT OFFICE 2,249,437

ADJUSTABLE REAMER

Harry C. Satterthwaite, Oakland County, Mich.

Application March 2, 1938, Serial No. 193,388

6 Claims. (Cl. 77—75.5)

This invention relates to metal working tools, and particularly relates to reamers in which the cutting blades are adjustably and removably attached to the body or holder.

One of the primary objects of the invention is to provide an improved reamer in which the cutting blades are individually wedged radially inwardly of the holder adjacent the front thereof.

Another object of the present invention is to provide a reamer of the type mentioned having a holding member associated therewith which is so constructed that each of the members which wedge the cutting blades radially inwardly are individually, yieldably urged into wedging position.

A further object of the present invention is to provide a reamer in which the cutters may be sharpened without removal from their holder.

A more specific object of the present invention is to provide a line reamer in which the cutter blades may be adjustably mounted in the holder.

Another object of the present invention is to provide wedging means for the cutting blades of a holder which are relatively inexpensive to manufacture thereby making the entire assembly economical to manufacture.

Another object of the present invention is to provide relatively simple wedging means which are individually positive in their action on each of the cutters so that the fits do not have to be as accurate as in prior structures, thereby facilitating both manufacture and assembly of the parts.

Other objects of the invention will become apparent from the following specification, the drawings relating thereto, and the claims hereinafter set forth.

In the drawings in which like numerals are used to designate like parts in the several views throughout;

Figure 1 is a side elevational view, with parts broken away illustrating parts in cross-section, of a reamer embodying features of the present invention;

Fig. 2 is an end elevational view, with parts broken away, of the reamer illustrated in Fig. 1;

Fig. 3 is a side elevational view of a modified form of the reamer illustrated in Fig. 1;

Fig. 4 is an end elevational view of another modified form of a reamer embodying features of the present invention;

Fig. 5 is a fragmentary cross-sectional view taken substantially along the line 5—5 of Fig. 4;

Fig. 6 is a cross-sectional view taken substantially along the line 6—6 of Fig. 5;

Fig. 7 is a view similar to Fig. 5 illustrating another modified form of the present invention;

Fig. 8 is a cross-sectional view taken substantially along the line 8—8 of Fig. 7;

Fig. 9 is a view similar to Fig. 7 illustrating another modified form of the present invention;

Fig. 10 is a cross-sectional view taken substantially along the line 10—10 of Fig. 9;

Fig. 11 is a fragmentary vertical cross-sectional view of another modified form of the present invention;

Fig. 12 is a vertical cross-sectional view of a modified form of the present invention applied to a shell reamer;

Fig. 13 is a side elevational view with parts broken away illustrating parts in cross-section of a line reamer embodying features of the present invention; and Fig. 14 is a cross-sectional view taken substantially along the line 14—14 of Fig. 13.

Referring to the drawings and referring particularly to Figs. 1 and 2, a reamer is illustrated comprising a main body portion or holder 20 having the usual tapered shank 22. The holder 20 is provided with a plurality of longitudinally extending slots 24 which may or may not be equally spaced, which lie substantially in planes passing through the axis of the holder. The bottoms of the slots are tapered with respect to the axis of the reamer, as shown in Fig. 1; and cutter blades 26, with the bottom edges thereof correspondingly tapered, are received within the slots 24. The rear ends of the cutter blades are chamfered at 28, and a locking collar 30 is chamfered at 31 at its forward face to fit the chamfer 28. The collar 30 prevents the blades 26 from moving back and also prevents them from moving radially outwardly at the inner ends; and is threaded upon the rear ends of the body 20 so as to permit adjustment of the cutters 26. A lock nut 32 with a lock washer 33 are preferably provided to lock the collar 30 in its adjusted positions.

The present invention deals particularly with locking the forward ends of the blades 26 against radial expansion. In accordance with the present invention, this is accomplished by forming, preferably adjacent the forward end of each blade in one side face thereof, a groove 34 of angular sectional configuration as best shown in Fig. 2. Each groove 34 extends in parallel relationship to the bottom edge of its blade.

The body member 20 is provided at its front end with a cooperating groove 36 in a side face of each slot 24, and in such a position that the slots 24 and corresponding grooves 36 are aligned and in communication with each other at the front face. The angularity of the grooves 36 with respect to the axis of the reamer is greater than the angularity of the grooves 34 with respect to the axis of the reamer; and a ball member 38 is inserted within each cooperating pair of grooves 34 and 36 at the front end of the reamer. The size of the grooves 34 and 36 and the ball members 38 are such that because of the different angularity between the grooves 34 and 36, the balls 38 will be received approximately only to about or slightly beyond their mid-points in the grooves, the remainder of the balls projecting beyond the forward end face of the holder 20. The purpose of the ball members 38 is to wedge each of the blades adjacent the forward ends thereof radially inwardly by engagement with the grooves 34 and 36.

In order to individually urge the ball members 38 into wedging position, a holding member 40 in the form of a plate is removably attached to the forward end of the holder 20. The holding member 40 is provided with a substantially central opening 42 therethrough, through which a screw 44 is received. The screw 44 is provided with a threaded end 46 which is threadably received within an axially aligned threaded opening 48 in the holder 20. The screw 44 is provided with an enlarged smooth cylindrical portion 50 adjacent its head which is received within an axially aligned recess 52 of complementary size and shape in the head. The portion 50 and the opening 52 are of considerable size so that relatively close fits may be economically attained so that an even pressure is applied to the plate 40 by the head, thus keeping the plate aligned and preventing its tilting.

The holding member 40 is formed with radially extending individually yieldable fingers 54, which are adapted to extend outwardly beyond the ball members 38 and overlie the centers of the ball members. Each one of the fingers 54 extends alongside of a corresponding blade 26 and engages its respective ball 38 and urges the ball into its wedging position. By this structure each of the ball members 38 is individually, yieldably engaged by one of the fingers and thus individually urged into wedging position. One advantage of this structure, as compared with prior structures, is that the parts do not have to be as accurately formed as in prior structures as each finger acts individually on a single ball and thus each ball is individually urged into wedging position independently of each other ball. By the individually resilient fingers substantially the same wedging action is applied to each ball, regardless of small variations in dimensions of the various parts so that the wedging action on all of the blades is substantially the same.

In this structure, in order to adjust the blades 26 longitudinally of the holder 20, it is merely necessary to loosen the screw 44 thus releasing the pressure of the yieldable fingers 54 on the ball members; and when the ball members 38 are released, the cutters 26 may be moved longitudinally of the holder to increase or decrease the effective diameter of the reamer. The locking collar 30 may then be advanced so that the chamfer 28 on the cutters is engaged to lock the rear ends of the cutters radially inwardly. By then tightening the screw 44, the yieldable fingers of the plate 40 again engage the ball members 38 and urge them into wedging position in the grooves 34 and 36, in which position they lock the outer ends of the blades 26 against radially outward movement as well as retain their rear ends against the collar 30.

In Fig. 3, a structure is illustrated in which the plate member 40 is urged inwardly, so that its yieldable fingers engage the ball members in the same manner as described above, by a longitudinally extending bolt 60, which extends through an axially aligned opening 62 through the body portion 20 and the shank 22. An accurately aligned, coaxial conical recess 63 is provided through the head of the bolt 60 which may be utilized to center the reamer on a grinding machine when grinding the cutters without removing them from the holder. A nut 64 is threadably received over the threaded inner end of the bolt 60; and by tightening the nut, the head of the bolt member 60 is drawn in thus forcing the plate member 40 inwardly as described above.

In Figs. 4 to 6, another modified form of the present invention is illustrated, in which instead of providing the grooves 36 in each of the recesses 24 as described, a singular annular recess 68 is provided in and concentrically of the forward face of the holder 20. This recess 68 communicates with each of the longitudinally extending slots 24 in the head and also is in such position that it communicates with the grooves in the cutters 26. Also in this embodiment, instead of providing the grooves 34 of angular cross-sectional configuration in the cutters 26, as in the embodiment shown in Figs. 1 and 2, a groove 70 of substantially semi-circular cross-sectional configuration is provided. The curvature of the groove 68 and the curvature of the grooves 70 are greater than the curvature of the ball members 38; and the grooves are so arranged relative to each other that the inner surface of the balls 38 is engaged by the inner edge of the groove 70, as shown in Fig. 4, and the outer edge of the balls 38 is engaged by the outer edge of the groove 68 so that the forward ends of the cutter 26 are wedged radially inwardly. Also, in this embodiment, in order to give the radially extending fingers 54 a greater degree of yieldability and also to permit twisting of the fingers, inwardly directed slots 72 are cut in the holding member 40 adjacent the sides of the fingers 54. As the fingers bear against the balls, each finger twists so that the ball is urged into the grooves 68 and 70 in wedging relation.

In Figs. 7 and 8, a structure is illustrated, in which in addition to the groove 68 in the holder 20 and the grooves 70 in the cutters 26, a recess 76 is provided in each of the fingers 54 adjacent the outer ends thereof and adjacent one edge of each. The recess 76 is of a greater curvature than the curvature of the ball members 38 and is so arranged that its outer edge engages the outer surface of the ball members 38. As the fingers 54 are yieldable, and as the engagement with the members 38 is at the outer edge of the recess 76, it is evident that the members 38 are individually urged radially inwardly and also axially inwardly by the fingers 54, which are preferably provided with the slots 72.

Also, in the structure illustrated in Figs. 7 and 8, a screw 44 is utilized to hold the plate member 40 in position on the head; and the screw 44 is provided with a co-axial recess 78 therein, which is preferably hexagonal in section. The entrance to this recess through the head is cone shaped as shown at 79; and the cone surface 79 is accurately centered on the screw. This surface 79, is used to align the reamer on the centers of a grinding machine so that the cutters may be accurately ground.

In Figs. 9 and 10, another modified structure is illustrated, in which the grooves 36 and 68 in the embodiments described above are dispensed with, and the ball members 38 are forced against the forward face of the holding member 20. The inner engaging faces of the fingers 54 are curved inwardly, as indicated at 80, and cut back, as indicated at 82, so that the ball members 38 are engaged adjacent their forward outer faces and thus urged radially inwardly and against the smooth and unground forward face of the holding member 20, so that the cutters 26 are each one individually urged radially inwardly. In this embodiment, the slots 72 are also provided in the holder 40 so that the fingers 54 may twist.

In Fig. 11, another modified structure is illustrated, in which the head 20 is provided with grooves 36 in each of the slots 24 and the cutters 26 are provided with the longitudinal grooves 70, as in the embodiment shown in Fig. 4. The grooves 70 and 36 are in the same relationship to each other as the grooves 34 and 36 in Fig. 1. Instead of using ball members, elongated pellets 84 are disposed in the grooves 70 and slots 36 so as to wedge the blades 26 radially inwardly. The grooves 36 are larger in diameter when using pellets than when using balls so that the pellets may assume wedging positions in the grooves. The pellets 84 may be tapered, if desired, and such pellets are urged into their wedging positions by the yieldable fingers 54 on the holding plate member 40.

In Fig. 12, the present invention is illustrated as being applied to a shell reamer in which a longitudinally extending, co-axial opening 88 is provided through the body member 20. A coaxial recess is provided adjacent the forward face of the body portion 20 and is threaded, as indicated at 90. The holding member 40 is also provided with a centrally disposed threaded opening 92 therethrough, the threads 92 being of less pitch than the threads 90. A short tubular holding member 94 is externally threaded with threads 96 extending over a portion adjacent the front of the member 94. The threaded portion 96 is adapted to be received within the threads 90 of the holder 20, and the threaded portion 98 is adapted to be received within the threaded opening 92 of the member 40. As the threads 92 are of less pitch than the threads 90, upon turning the member 94 the differential action occurring between the threads 96 and 98 causes the plate member 40 to be drawn up against the ball members 38 which urge the cutters 26 radially inwardly adjacent the fronts thereof.

In Figs. 13 and 14, a line reamer is illustrated embodying features of the present invention, in which the cutting blades of the reamer may be axially adjusted.

The line reamer includes an elongated body member 101 which is externally threaded at spaced intervals therealong. The spaces between the threaded portions are provided with the recesses 24 and 25 in main body portions 20 and 21, respectively, for receiving therein the cutter blades 26 and 27, respectively. The grooves 25 correspond to the grooves 24 and the cutting blades 27 correspond to the cutters 26. Grooves 70 are provided in the cutters 26 and 27, as in the embodiments described above, and an annular groove 68 is provided in the front face of each of the main body portions 20 and 21 as in the embodiment illustrated in Figs. 4 to 6. The ball members 38 are received in the grooves 70 and 68 as in the embodiment illustrated in Figs. 4 to 6, and serve to wedge the forward ends of the cutters 26 and 27 radially inwardly.

A pilot sleeve 102 is received over the threaded portion of the line reamer 101 forward of the body portion 21. Threaded members 104, which are split along the serrated lines 105 (Fig. 14), are disposed within the pilot sleeve 102 for rotation therewith and are threadably received over the threaded portion of the line reamer in the position described. A holding member in the form of a unitary tubular member 106 is received within the pilot member 102 and has axially extending, yieldable fingers 108 which extend toward the forward face of the body portion 21. The fingers 108 are radially yieldable and are chamfered, as indicated at 110, and engage the ball members 38 along the chamfered surface, so that as the nut member is threaded axially toward the blades, the fingers 108 are urged radially outwardly and the ball members are urged radially inwardly into wedging position. Another pilot member 112, which is similar to the pilot member 102 but slightly larger in size, is disposed forwardly of the forward face of the body portion 20. A holding member 116, which is generally similar to the holding member 106, but which is longitudinally split and of correspondingly larger size, is disposed within a sleeve 117 in press fit relationship; and the sleeve 117 has substantially the same diameter as the pilot member 112. The member 116 has axially extending, yieldable fingers 118 with chamfered portions 120 which engage the ball members 38 and force them into wedging position as the members 104 are urged against the members 116 toward the holder 20. Locking collars 30, as in the embodiment illustrated in Figs. 1 and 2, are also provided which engage the rear edges of the cutters 26 and 27 to urge the rear edges thereof radially inwardly and also for adjusting the cutters 26 and 27 longitudinally of the line reamer. The threaded portions 130 of the locking collars 30 and the threaded portions 131 of the lock nuts 32 are constructed the same as the threaded members 105, that is they are split along serrated lines to provide separable sections.

In order to assemble the line reamer illustrated in Figs. 13 and 14, it is merely necessary to place the split halves of the threaded members 104 on the threaded portions forwardly of the holders 20 and 21, respectively, in approximately their desired positions. The pilot sleeves 102 and 112 which are of slightly greater diameter than the diameters of the holders 20 and 21 may then be slid over the threaded members 104. In order to fix the collars 102 and 112 to their respective threaded members 104, inwardly directed lugs 150 are provided on the collars and are engaged in diametrically opposed recesses 152 in the split halves of the members 104. By turning the sleeves 102 and 112, the threaded members 104 may be moved axially of the line reamer 101. The member 106 may be made solid as there are no obstructions to prevent its positioning on the reamer, while the member 116 is split so that the split halves may be positioned forwardly of the body portion 20. It is evident that it is necessary to split the member 116 as, otherwise, it could not be positioned longitudinally of the reamer over the body portion 21. The split halves of the member 116 are received within the collar 117 preferably by a press fit and are disposed between the members 104 and the front face of the holder 20. The split members 130 and 131 of the locking collars 30 and lock-nuts 32 are assembled in the same way as the threaded members 104. The threaded members 130 and 131 are also fixed relative to their outer shells by inwardly directed lugs and by similar construction to that illustrated at 150 and 152 for the pilot members 102 and 112.

In order to adjust the cutters 27 and 26 of the line reamers 101 longitudinally of the reamers, it is merely necessary to adjust the positions of the pilot members 102 and 112 and the locking collars 30 threadably along the threaded outer surface of the line reamer 101.

The term "communicating", which is used in the specification and claims to define the relationship of the grooves 24, 34, 36, 68 and/or 70 as illustrated in the various embodiments, means that these grooves have certain portions in common so that when a member is disposed in the common portions the adjoining walls of the respective grooves may be engaged in the relationship described.

Formal changes may be made in the specific embodiments of the invention described without departing from the spirit and substance of the invention, the scope of which is commensurate with the appended claims.

What is claimed is:

1. A reamer comprising a holder having a plurality of slots therein spaced therearound, means forming a communicating groove in said holder which communicates with said slots, a cutter disposed in each of said slots, each of said cutters having a recess therein adjacent said means, said means and said recess being arranged at different angles to the longitudinal axis of the cutter, a ball member disposed within each of said recesses and said means engaging the holder and its respective cutter to wedge the forward ends of each cutter radially inwardly, and means slidably engaging each of said ball members to urge said ball members into wedging position.

2. A reamer comprising a holder having a plurality of slots therein spaced therearound, means forming a communicating groove in said holder which communicates with each of said slots, a cutter disposed in each of said slots, each of said cutters having a recess therein adjacent said means, said means and said recess being arranged at different angles to the longitudinal axis of the cutter, a ball member disposed within each of said recesses and said means engaging the holder and its respective cutter to wedge the forward end of each cutter radially inwardly, a holding member removably attached to the forward face of said holder, said holding member having yieldable fingers individually slidably engaging each of said ball members to independently urge each of said ball members into wedging position.

3. A reamer comprising a holder having a plurality of slots therein spaced therearound, means forming a communicating groove in said holder which communicates with each of said slots, a cutter disposed in each of said slots, each of said cutters having a recess therein adjacent said means, said means and said recess being arranged at different angles to the longitudinal axis of the cutter, a ball member disposed within each of said recesses and said means engaging the holder and its respective cutter to wedge the forward end of each cutter radially inwardly, a holding member removably attached to the forward face of said holder, said holding member having radially extending, individually yieldable fingers thereon which slidably engage each of said ball members to independently urge each of said ball members into wedging position.

4. A reamer comprising a holder having a plurality of slots therein spaced therearound, means forming a communicating groove in said holder which communicates with each of said slots, a cutter disposed in each of said slots, each of said cutters having a recess therein adjacent the forward end thereof and adjacent said means, said means and said recess being arranged at different angles to the longitudinal axis of the cutter, a ball member disposed within each of said recesses and said means engaging the holder and its respective cutter to wedge the forward end of each cutter radially inwardly, means having yieldable fingers slidably engaging each of said ball members to independently urge each of said ball members into wedging position, and means engaging the rear end of each cutter for adjustably fixing said cutters longitudinally of said holder.

5. A reamer comprising a holder having a plurality of slots therein spaced therearound, means forming a communicating groove in said holder which communicates with each of said slots, a cutter disposed in each of said slots, each of said cutters having a recess therein adjacent said means, said means and said recess being arranged at different angles to the longitudinal axis of the cutter, and a member disposed within each of said recesses and said means engaging the holder and its respective cutter to wedge the forward end of each cutter radially inwardly, and individually resilient members slidably engaging each of said members to independently urge each of said members into wedging position.

6. A reamer comprising a holder having a plurality of slots therein spaced therearound, means forming a communicating groove in said holder which communicates with each of said slots, a cutter disposed in each of said slots, each of said cutters having a recess therein adjacent said means, said means and said recess being arranged at different angles to the longitudinal axis of the cutter, a member disposed within each of said recesses and said means engaging the holder and its respective cutter to wedge the forward end of each cutter radially inwardly, a holding member removably attached to the forward face of said holder, said holding member having radially extending, individually yieldable fingers thereon which slidably engage each of said first named members to independently urge each of said members into wedging position.

HARRY C. SATTERTHWAITE.